US008626823B2

(12) United States Patent
Kumar

(10) Patent No.: US 8,626,823 B2
(45) Date of Patent: Jan. 7, 2014

(54) PAGE RANKING SYSTEM EMPLOYING USER SHARING DATA

(75) Inventor: Ankesh Kumar, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 488 days.

(21) Appl. No.: 12/347,896

(22) Filed: Dec. 31, 2008

(65) Prior Publication Data

US 2009/0125511 A1  May 14, 2009

Related U.S. Application Data

(63) Continuation-in-part of application No. 11/939,516, filed on Nov. 13, 2007, now Pat. No. 7,606,865.

(51) Int. Cl.
*G06F 15/16* (2006.01)

(52) U.S. Cl.
USPC ............ 709/203; 709/217; 709/223; 707/721

(58) Field of Classification Search
USPC .......... 709/203, 217, 219, 223, 224; 707/706, 707/721, 722, 723, 727, 732, 748, 751, 752, 707/802; 715/753
See application file for complete search history.

(56) References Cited

U.S. PATENT DOCUMENTS

| | | | |
|---|---|---|---|
| 6,067,552 A * | 5/2000 | Yu .................................. | 715/234 |
| 6,070,158 A * | 5/2000 | Kirsch et al. ......................... | 1/1 |
| 6,496,849 B1 | 12/2002 | Hanson et al. | |
| 7,130,885 B2 | 10/2006 | Chandra et al. | |
| 7,219,130 B2 | 5/2007 | Kumar et al. | |
| 7,359,951 B2 * | 4/2008 | Goel et al. ..................... | 709/217 |
| 7,444,358 B2 * | 10/2008 | Paczkowski et al. .................. | 1/1 |
| 7,788,260 B2 | 8/2010 | Lunt et al. | |
| 7,860,871 B2 * | 12/2010 | Ramer et al. ................... | 707/751 |
| RE42,262 E * | 3/2011 | Stephens, Jr. .................. | 709/203 |
| 7,966,325 B2 * | 6/2011 | Singh ............................ | 707/732 |
| 8,015,119 B2 * | 9/2011 | Buyukkokten et al. ........ | 705/319 |
| 8,183,735 B2 * | 5/2012 | Yanagisawa et al. .. | 310/216.071 |
| 8,244,721 B2 * | 8/2012 | Morris et al. .................. | 707/723 |
| 2005/0076097 A1 | 4/2005 | Sullivan et al. | |
| 2005/0177385 A1 * | 8/2005 | Hull et al. ......................... | 705/1 |

(Continued)

FOREIGN PATENT DOCUMENTS

EP    1782604 B1    5/2011

OTHER PUBLICATIONS

PCT/US07/23818 International Search report and written opinion, Jun. 5, 2008.

*Primary Examiner* — Lashonda Jacobs
(74) *Attorney, Agent, or Firm* — Fish & Richardson P.C.

(57) ABSTRACT

Standard web content search result relevance and ranking is improved by considering certain social reference data, such as the number of times an item of content is shared, normalized for the number of times it is viewed. A system and method for improving the relevance and ranking includes a system and method for tracking the social references and a system and method for operating on search engine results to either re-order the results based on social reference data, re-order the search results based on a combination of the social reference data and the web search engine's ordering, and/or display the social reference data either with the search results reordered or in the order provided by the web search engine. Many different forms of data constitute social reference, including sharing content or a link thereto by email, SMS, posting to a link-sharing site, blog, and bookmarking in a web browser.

26 Claims, 15 Drawing Sheets

(56) References Cited

U.S. PATENT DOCUMENTS

| | | |
|---|---|---|
| 2005/0262052 A1* | 11/2005 | Daniels et al. .................... 707/3 |
| 2006/0053194 A1 | 3/2006 | Schneider et al. |
| 2007/0233671 A1* | 10/2007 | Oztekin et al. .................... 707/5 |
| 2007/0239701 A1 | 10/2007 | Blackman et al. |
| 2008/0005073 A1* | 1/2008 | Meek et al. ........................ 707/3 |
| 2008/0010319 A1 | 1/2008 | Vonarburg et al. |
| 2008/0071774 A1 | 3/2008 | Gross |
| 2008/0071929 A1* | 3/2008 | Motte et al. ................... 709/246 |
| 2008/0147810 A1 | 6/2008 | Kumar et al. |
| 2008/0184138 A1 | 7/2008 | Krzanowski et al. |
| 2008/0243830 A1 | 10/2008 | Abhyanker |
| 2008/0256194 A1 | 10/2008 | Girouard et al. |
| 2008/0301111 A1 | 12/2008 | Statchuk |
| 2008/0313206 A1 | 12/2008 | Kordun et al. |
| 2008/0319955 A1 | 12/2008 | Douglass et al. |
| 2009/0204601 A1* | 8/2009 | Grasset ............................ 707/5 |
| 2009/0327417 A1* | 12/2009 | Chakra et al. ................. 709/204 |
| 2010/0082593 A1* | 4/2010 | Singh ............................ 707/707 |
| 2010/0094869 A1* | 4/2010 | Ebanks ......................... 707/732 |

* cited by examiner

YAHOO! NEWS

HOME | U.S. | BUSINESS | WORLD | ENTERTAINMENT | SPORTS | TECH | POLITICS | SCIENCE | HEALTH | TRAVEL | MOST POPULAR

World Video | Middle East | Europe | Latin America | Africa | Asia | Canada | Australia/Antartica | Kevin Sites Search [         ] WEB SEARCH

Nobel-winning playwright Harold Pinter dies at 78

By PAISLEY DODDS, Associated Press Writer - Thu Dec 25, 9:44 am ET

— 18 [b] Buzz Up | Send | Share — 16 | Print

Digg
Facebook
News vine
del.icio.us
Reddit
StumbleUpon
Technorail
Yahoo! Bookmarks LONDON - Harold Pinter, praised as the n playwright of his generation and a longtime has died after a long battle with cancer. He Pinter, whose distinctive contribution to the the Nobel Prize for Literature in 2005, died to his second wife, Lady Antonia Fraser.

"Pinter restored theater to its basic elements: an enclosed space and unpredictable dialogue, where people are at the mercy of each other and pretense crumbles," "the Nobel Academy said when it announced Pinter's award. "With a minimum of plot, drama emerges from the power struggle and hide-and-seek of interlocutuin."

AP - In this Oct. 17, 1973 file photo, British playwright Harold Pinter is seen in New York. Pinter, whose...

The Nobel Prize gave Pinter a global platform which he seized enthusiastically to denounce U.S. President George W. Bush and then-British Prime Minister Tony Blair.

News Search  Advanced
[         ]
All News — 14

FIG. 2
(PRIOR ART)

Social Mail — PLACE HOLDER TO INFORM THE USER THAT HIS A/C NEEDS TO BE CONFIRMED.

GROUP EMAIL DONE BETTER

WELCOME ANKESH
SIGN OUT

COMPOSE NEW | INBOX | ADDRESS BOOK | MY PROFILE          FAQ | SUGGESTIONS | UPGRADE

Compose New SocialMail

INSERT PEOPLE    INSERT GROUP
EACH ADDRESSES SHOULD BE SEPARATED BY A COMMA

TO: AKUMAR@DEV02.IPONDEMAND.NET, ELIZABETH@APPMAIL.COM, MACKENZIE.KELLER@APPMAIL.COM, TEST01@DEV02.APPMAIL.COM

YOU ARE USING 6 OUT OF 25 AVAILABLE CONTACTS TO INCREASE YOU QUOTA CLICK HERE

SUBJECT: WE SHOULD DISCUSS SOUTH AFRICA HINTS IT MAY BROADEN LAND SEIZURES- CNN NEWS

[formatting toolbar: B I U ABC | ≡ ≡ ≡ ≡ | ⊕ ⊘ □ ✗ ⊡ ⊞ | ◯ ✎]
[FONT FAMILY ▼]  [FONT SIZE ▼]
[≡ ≡ | x₂ x² | icons...]

MESSAGE:
HTTP://WWW.CNN.COM/2008/WORLD/AFRICA/10/17/SAFRICA.LAND.REUT/INDEX.HTML

HEY GUYS, THOUGHT YOU MIGHT FIND THIS ARTICLE INTERESTING.

AS AN EXTENSION OF OUR LAST GATHERING, PLEASE POST YOUR COMMENTS AND OPINIONS.

WE LOOK FORWARD TO MEETING AGAIN NEXT WEEK.

ADD EVENT
[SEND]  [MORE OPTIONS]
NOTE: DEFAULT SETTING WILL BE USED INCLUDING INITIATING A DISCUSSION FOR THIS EMAIL

Grouptivity  LEARN MORE  TEMPLATES  FAQ  BUZZ  TELL A FRIEND

RECENT POSTS FOR ANKESH

| BOOKMARK | TAGS | LAST UPDATED |
|---|---|---|
| CLEAR REGISTERED TRAVELERS FLY THROUGH AIRPORT SECURITY | TRAVEL SECURITY AIRPORT | 2007-03-22 |
| GROUPTIVITY MAKES PRIVATE ONLINE DISCUSSIONS EASY | SYSTEM UNIFIED | 2007-03-22 |
| TEQLO | 2.0 SOFTWARE WEB WEB2.0 | 2007-03-20 |
| DAPPER: THE DATA MAPPER | 2.0 AGGREGATOR FEED RSS SCRAPER | 2007-03-20 |
| USERPLANE | FLASH CHAT AND VIDEO CHAT SOFTWARE - WEB CHAT SCRIPTS FOR ENTERPRISE MESSAGING INSTANT MESSAGING SOFTWARE | ADVERTISING COLLABORATION SEARCH WEB 2.0 | 2007-03-20 |
| POPULAR MEDIA - VIRAL MARKETING TECHNOLOGY PLATFORM. WORK-OF-MOUTH FOR MAJOR BRANDS | EMAIL MARKETING VIRAL | 2007-03-17 |
| ZLIO.COM - START YOUR ONLINE SHOP - MAKE MONEY - YOUR VERY OWN SHOP | 2.0 ADVERTISING BLOG MARKETING ONLINE | 2007-03-14 |
| FEED DIGEST: MIX, CONVERT, AND REPUBLISH FEEDS | RSS FEED ALTER AGGREGATOR 2.0 | 2007-03-12 |
| FILTER RSS FEEDS WITH FEED RINSE | RSS WEB2.0 FILTER FEED TOOLS | 2007-03-12 |
| FEEDBLENDR - BLENDING RSS, ATOM AND RDF FEEDS INTO A SINGLE RIVER OF NEWS | RSS AGGREGATOR FEEDS WEB2.0 | 2007-03-12 |
| KAMOODLE - THE LEADER IN CONTENT TARGETED SPONSORED LINKS ON THE WEB'S BEST SITES ONLINE ADVERTISING PAY PER CLICK | ONLINE ADVERTISING PAY PER CLICK | 2006-10-05 |
| INDUSTRYBRAINS, LLC - PREMIUM PERFORMANCE MARKETING SOLUTIONS FOR ADVERTISERS AND PUBLISHERS ONLINE ADVERTISING PAY PER CLICK | ONLINE ADVERTISING PAY PER CLICK | 2006-10-05 |
| ADSONAR FOR ADVERTISERS - LOGIN ONLINE ADVERTISING | ONLINE ADVERTISING PAY PER CLICK | 2006-10-05 |
| PAY PER POST :::: GET PAID FOR BLOGGING, BLOG ADVERTISING, ADVERTISE ON BLOGS PAY PER BLOG MARKETING | PAY PER BLOG MARKETING | 2006-10-06 |
| SLIDESHARE >> LOGIN POWERPOINT ONLINE | POWERPOINT ONLINE | 2006-10-06 |
| POWERSET, INC. NEW SEARCH ENGINE | SEARCH ENGINE | 2006-10-06 |
| VIDEOEGG RUNS VIDEO FROM WEBSITES | PARTNER VIDEO | 2006-10-08 |

START A DISCUSSION

MYSPACE  XANGA  HIS  FRIENDSTER  PICZO  TAGGED  LIVE JOURNAL  TYPEPAD  BLOGGER

POST TO MYSPACE

USER EMAIL:
PASSWORD:
SECTION  BLOG ▸
SUBJECT:
CONTENT TO POST:  ◂▸

POST

OR DO THE FOLLOWING STEP
STEP 1. CLICK ON BLOG ON THE MENU BAR.
INVITE | FILM | MAIL | BLOG | BLOG ▸

STEP 2. CLICK ON POST NEW BLOG ON MY CONTROLS SECTION.

| MY CONTROLS |
| POST NEW BLOG |
| VIEW BLOG |
| CUSTOMIZE BLOG |
| BLOG SAFE MODE |

STEP 3. WRITE SUBJECT NAME AND WRITE IN THE BODY

SUBJECT  TEXT
CATEGORY:  NONE

BODY:  [STYLE]  [FONT]

PAGE RANKING SYSTEM EMPLOYING USER SHARING DATA

CROSS-REFERENCE TO RELATED APPLICATIONS

The present application is a continuation-in-part of U.S. patent application titled "Collaboration System and Method", Ser. No. 11/939,516, filed on Nov. 13, 2007, now U.S. Pat. No. 7,606,865, which, in its entirety, is hereby incorporated herein by reference and to which priority is claimed. This application also incorporates by reference herein U.S. patent application Ser. No. 11/028,691 and Ser. No. 10/862,727, filed on Jan. 4, 2005 and Jun. 7, 2004, respectively, and U.S. Pat. No. 7,219,130.

BACKGROUND

The present disclosure is related to the field web searching, and more particularly to systems and methods in which web search results are ranked and ordered.

A search engine results page, or SERP, is the listing of web pages returned by a web search engine in response to a keyword query. The results normally include a list of web pages, in the form of an identifying name as a link to the underlying uniform resource locator, or URL, which is effectively an address for the web page on the world wide web (or the "web"), and a short description or excerpt of the web page showing where the keyword matched the content within the web page. As used herein, "web" shall be used in short for the World Wide Web, and shall refer to the system of interlinked or linkable content located on a wide variety of storage media which may be accessed via an interconnect network of computers and similar devices referred to as the Internet. Furthermore, the term "internet content", or simply "content" as used herein shall refer to text, video, audio, and virtually any other type of information and format and combinations thereof, which is accessible via the world wide web, and which may be sorted and indexed for relevance and rank in response to a web search request.

Once the SERP is obtained for a keyword query, the user may navigate the web to those results and view them, for example using a web browser program, share one or more of the resulting links, for example by email or text, share content found on the linked pages, again by email or txt, and so forth. That is, one or more of many common software tools may be used to access, share, copy, edit, tag, comment on, etc. the entries in the SERP. Users may also browse directly to content through links and referrals, not necessarily from SERP.

The concept of "Sharing" has evolved over the last two decades. Initially, sharing meant providing a user with the ability to email an item of content to a friend via a convenient control (e.g., button) on a website or built into the web browser application. Sharing has now evolved into a plethora of 3rd party websites for bookmarking, saving or posting to other locations like social networking sites where friends and family can view the content being referenced. Sharing is distinct from other social interactions like commenting in that a user has explicitly attached their reputation to the content and implicitly endorsed it. This sharing is done either in a private manner (e.g., email a friend), in a semi-public manner (e.g., posting to a social network), or in a public manner (e.g., posting to social news sites). So other users can benefit from the work done by the users sharing.

In many cases, more than one of these tools are presented to a user in a single interface for convenience and simplicity of use. For example, as shown in FIG. 1, a Yahoo! News web page 10 (http://news.yahoo.com/) presents a user with the option of sharing an article being read to another user by way of a "send" pull-down menu 12. In the example of FIG. 1, the only available conduit for sending the article being read is email, although other such conduits are available, such as sending the line via SMS text messaging. Another example of sharing of content from a Yahoo! News web page 14 is illustrated in FIG. 2, in which a "share" pull-down menu 14 presents the user with a number of options for appending the link to the content being read to a social networking page, such as Digg, Facebook, etc. In addition to sharing the Yahoo! News pages, users may also comment on, and "vote" for content via the "Buzz Up" link 18 shown in FIGS. 1 and 2. These convenient methods for sharing are in recognition of the value and desire of users to interact around information. Web site operators that provide these types of convenient tools for users validate the fact that people want to comment on, modify and combine ("remix"), share, and use the content in ways that are suitable to them.

The SEPR is a result of running what is referred to as a web search engine (or simply a search engine). This type of application assists users with finding, among the staggering number of web pages, images, video, audio, web log (blog), and myriad other file types (content) accessible via the Internet, those relevant to their interests. Common search engines include Google, Yahoo! Search, Ask, Microsoft Live Search, etc. Such search engines typically have aspects that autonomously search the web (referred to as web crawlers) building directories of search terms and associated addresses at which content related to those terms can be found. While each search engine operator has its own, generally proprietary relevance algorithms, each search engine must make a determination as to whether an item of content in its directory is relevant to a user's search request, and if so present that content to the user in response to the search request. In addition to relevance, there is a desire to rank those search results determined to be relevant such that the most relevant content is presented to the user first, the second most relevant content presented second, and so on.

To date, relevance and rank have primarily been determined based on reference to characteristics of the content intrinsic to its web presence. That is, attributes such as how many other websites link to a subject website, how popular those linking websites are, how many times the item of content contains a searched keyword, and so forth are used to assign a numerical weight to elements of a set of search results, and the element with the highest weight is presented first. PageRank, a technique employed by the Google search engine (see U.S. Pat. No. 6,285,999, incorporated herein by reference) is an example of such a relevance and ranking process. It will be noted that the typical relevance and ranking process employs only attributes intrinsic to the content such as presence of keywords, keyword density, keyword placement, etc., and not attributes extrinsic to the content, such as the actual use of the content, in assigning ranking weights. For the purposes hereof, we term this limited class of data analysis for relevance and ranking "internal reference", as in reference only to attributes internal to the web.

Ranking of search results historically has been done as follows. A software tool referred to as a web-crawler autonomously examines websites, and uses an algorithm to sort and order what the crawler uncovers. One very common algorithm employs the location (e.g., HTML title tag) and frequency of keywords on a web page to determine whether the web page discusses and is "about" the keyword. For example, there is an assumption that the more a term is used near the top or start of a web page, the more relevant that page is to the searched term, and further an assumption that a word used more frequently on a web page relative to other words on that page is more relevant to the overall content of that page, and thus of greater interest when ranking results of pages in which a searched term appears. But because each search engine has a different algorithm, the same search performed by different search engines produce different results. Even so, the majority of common search engines refer to such location/frequency data and other internal factors when doing their relevance and ranking analysis.

However, we have recognized that many more factors may be useful or even key in determining relevance and ranking of search results. In the tautology of the reference factors, there are internal and external factors. For the purposes hereof, we refer to one class of external factors as "social reference" factors, as described further below. Prior web search relevance and ranking processes have largely overlooked the importance of the social reference factors.

A number of search engines do consider certain social reference factors, such as the number of third party comments appended to an article after its web posting, the number of links added to a article after its web posting, and the re-writing of an article with a link back to the original (so called Fresh content). Furthermore, non-search applications such as the aforementioned Yahoo! Buzz, track and employ the number of email shares, user ranking and so forth in determining, for example, which stories to present on a news web page. There are also a number of human decision-making resources for indexing, organizing, and reviewing content (e.g., www.stumpedia.com, www.findingdulcinea.com, www.mahalo.com, and www.wikipedia.com).

However, there are many other social reference factors not yet appreciated as being of great value in determining relevance and ranking, specifically of web content search results. Of particular interest herein are algorithmic relevance and ranking of web content search results that utilize external, social reference data (i.e., do not require a user to make the relevance and ranking decisions). There is a need in the art for an improved algorithmic search analysis process and system employing same that utilizes additional external social reference factors in determining relevance and ranking of web content search results.

SUMMARY

Accordingly, the present disclosure is directed to systems and methods for providing algorithmically determined relevance and ranking data based on one category of social reference, content sharing. According to this disclosure, content sharing social reference data (or simply content sharing) includes interactions a user has with web content which result in some peer-to-peer, peer-to-group, or group-to-peer sharing of the content address, or a portion of the content itself. A search engine may base its relevance and rank systems exclusively or partially (i.e., in conjunction with internal reference data) on content sharing social reference data. A user may thereby be presented with relevant search results, ranked by or including content sharing data, for example how often the item of content has been shared, and possibly in conjunction with other ranking data (internal and/or external reference).

A wide variety of interactions with content may comprise content sharing social reference. Common examples include, but are not limited to: a user sending (via email, instant messenger, etc.) a link or "bookmark" to content to another user; a user posting content (e.g., adding to a blog which becomes visible to others); a user applying a label to content visible to others; a user making a purchase or request from a website; and so forth. Indeed, social reference data may be obtained from purely human interaction with content as well as with hybrid human/computer interaction with content, such as a user's computer automatically bookmarking a site after a user manually browses to that site.

The content sharing social reference methods for web search relevance and ranking is in contrast to established internal reference algorithmic or machine-based approaches where relevance is determined by analyzing the text of each item of content or the link structure of the content.

The content sharing social reference methods for web searching relevance and ranking may be collaborative, such as peer-to-peer-or-group harvesting, directory creation and upkeep, tag engines, social ranking, posting of comments on bookmarks, news, images, videos, podcasts and other web pages. These methods may also be individual, relying on a user's input or interactions with content, such as social bookmarking or direct interaction with the search results such as promoting or demoting results the user feels are more or less relevant to their query.

The present invention utilizes the results of an independent system for tracking content sharing, either individual or collaborative actions. With the raw data relating to content sharing available to it, a system according to the present invention may calculate and apply a content sharing weighting factor to keyword directory data in order to produce a ranked list of results to a web search request. Alternatively, the weighting factor calculated for the content sharing data may be applied to an otherwise ranked response to a search request to re-rank those results to take into account the content sharing data. According to still another variation of this concept, the content sharing weighting data may be combined with other ranking data, such as PageRank data, to obtain a weighting factor for elements of content responsive to a search request.

The present invention contemplates a wide range of techniques to determining a weighting factor based on content sharing data. Examples include: normalization for number of views (e.g., number of page shares/number of page views), normalization by type of page (e.g., number of shares for retail page/number of similar retail pages), normalization by type of sharing conduit (e.g., number of shares for bookmark by email/number of bookmark page shares), normalization by number of recipients or recipient type, by tag or tag type, and so forth. In fact, virtually any trackable sharing-type interaction with content may form the basis for obtaining and employing content sharing social reference data for relevance and ranking.

Accordingly, a system is disclosed herein for producing web content keyword search results having associated rank scores based on external, social reference data, comprising a web server on which is operating a web content keyword search engine; a reference counter for maintaining a count of the number of social references made to an item of content; a user interface to said search engine for receiving a web keyword search request; a processor programmed to receive said request and in response thereto access said web server to execute said search request, receive in response to said search request an identification of one or more items of content, and at least one of said items of content being the subject of a count of the number of social references to said item of content as maintained by said reference counter; associate each said item of content for which said item of content is the subject of a count of the number of social references to said item of content with a count of the number of social references to said item of content as maintained by said reference counter; and provide said items of content with an associated count of the number of social references to said items of content for display as the results of said web content keyword search.

A method is also disclosed for generating results from a web content keyword search having an associated social reference ranking, comprising receiving a web content keyword search request; performing a web content keyword search in response to said search request; receiving an identification of at least one item of content in response to said web content keyword search; obtaining, from a reference counter, a count of the number of social references made to each item of content received in response to said web content keyword search; determining a social reference ranking factor at least in part as a function of the count of social references to said content; associating, for each received item of content, said social reference ranking factor to said content; and delivering said items of content with the associated social reference ranking factor for display as the results of said web content keyword search.

Other aspects of the system and method according to the present invention are further detailed below. Thus, the above is a summary of a number of the unique aspects, features, and advantages of the present disclosure. However, this summary is not exhaustive. These and other aspects, features, and advantages of the present disclosure will become more apparent from the following detailed description and the appended drawings, when considered in light of the claims provided herein.

BRIEF DESCRIPTION OF THE DRAWINGS

In the drawings appended hereto like reference numerals denote like elements between the various drawings. While illustrative, the drawings are not drawn to scale. In the drawings:

FIG. 2 is an example of another web site which provides users with the option to share the displayed content, or a link thereto, to a third party site, web log, or bookmark application.

FIGS. 5A-5C are illustrations of interfaces in which a user may share an item of content by email, bookmarks, upload to a third party web site, etc.

FIG. 7 is an exemplary screen short of a search engine results page ordered in the ranking provided by the search engine, together with data displaying a normalized share ranking according to an embodiment of the present invention.

FIG. 9 is an example of a user interface for incorporating bookmarks into an application.

FIG. 10 is an example of a user interface for posting content from a collaboration system to a third party web site.

DETAILED DESCRIPTION

The system and method disclosed herein are particularly applicable to web services based collaboration system and it is in this context that the system and method are described. It will be appreciated, however, that the system and method has greater utility since the system and method can be implemented with other technologies and architectures that are within the scope of the system and may be used to implement other business or social functions in addition to the collaboration system described below as an example of an implementation of the system and method.

Figure 3:
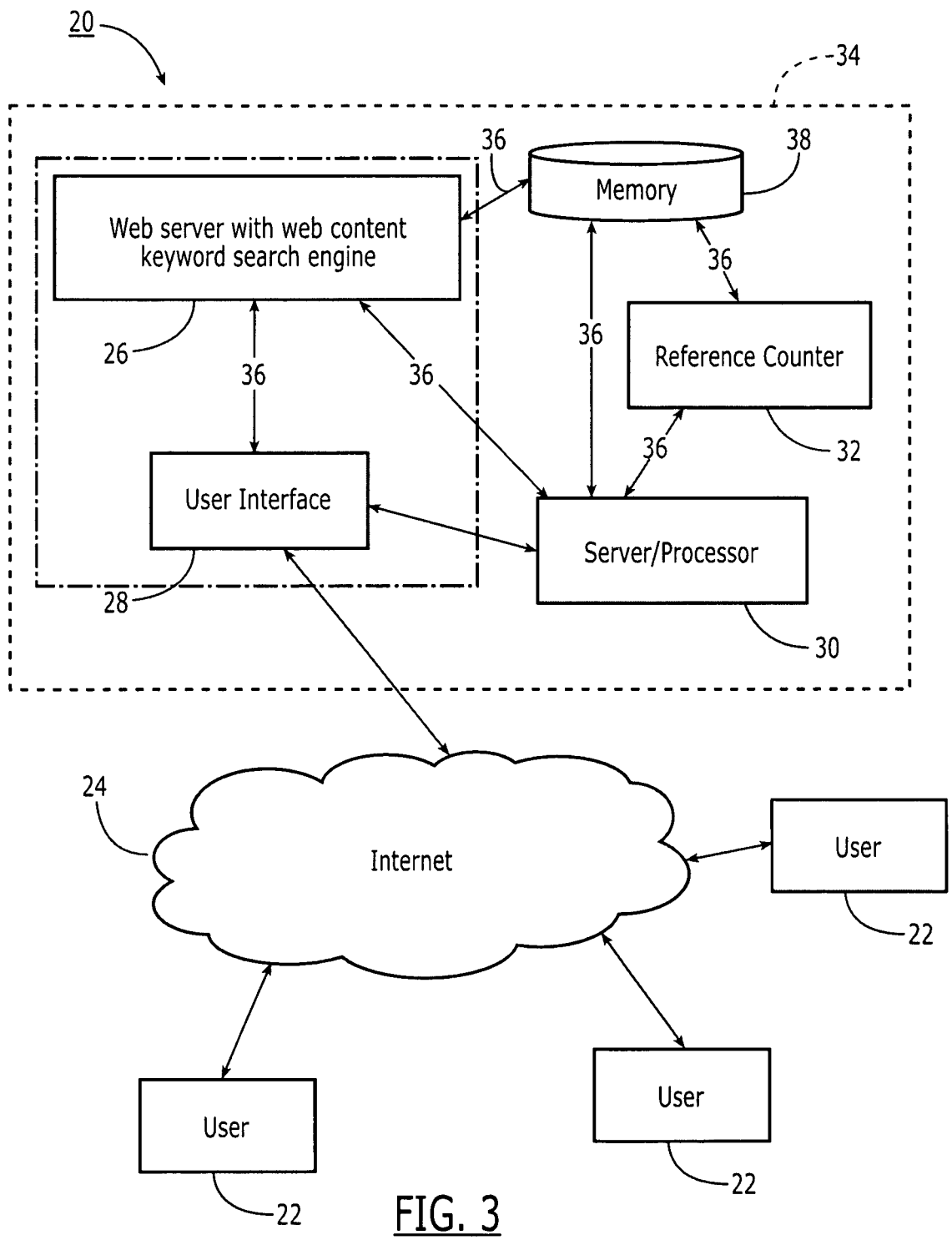
FIG. 3 is a block diagram illustrating networked web services devices/software and multiple user computing devices connected via the Internet according to one embodiment of the present invention.

With reference now to FIG. 3, there is shown therein a generic block diagram of a web services implemented system 20 according to one embodiment of the present invention in which multiple user computing devices 22 are in communication with one or more web services devices via the Internet 24. Those web services devices may include a computer server or the like 26 on which there is operating a web content keyword search engine, a user interface 28 associated with said server 26, a server/processor 30, and a reference counter 32, discussed in further detail below. It will be appreciated that one or more of these web service devices may communicate with one another via the Internet 24 or via a local area network 36. Alternatively, each of said web service devices may form a part of a single, integrated web server, as illustrated by the enclosing outline 34, which includes, a processor, memory, and appropriate input and output controls and interfaces. As indicated, multiple user computing devices 22 may simultaneously access and employ the services of the web service devices via the Internet 24. According to still other embodiments, a user may directly access user interface 28 without resort to an Internet connection.

Each user computing device 22 may be a processing unit based device with sufficient memory, processing power and connectivity to interact with the web service devices, such as a wireless email device, a cellular phone, a networked personal digital assistant (PDA), a personal computer, a laptop computer, etc. Connections between the user computing devices 22 and Internet 24 may be by way of a wired or wireless computer and/or communications network that uses a protocol to exchange information between the user computing devices 22 and the web services devices.

One or more of the web services devices are connected to a storage system 38, such as a database for example, that stores and may also allow authorized user computing devices 22 to obtain controlled/structured access to data as is well-known in the art. The hardware and software for implementing the above elements are well known and are not explained further herein.

As mentioned, system 20 includes a reference counter 32 as part of the web services devices. Reference counter 32 is a device and/or software which monitors users' social references to individual items of web content, and keeps a running count of certain types of those social references. Such social references, as used herein, include a user's sending an item of web content, or the address of or link to an item of content, to another user, for example by email, or SMS text messaging. Unless specified otherwise, as used herein "an item of content" includes reference to the address, location, URL, link, etc. to that item of content (e.g., adding an item of content to a bookmark list means adding the link to the content itself to the bookmark list). Social references also include a user adding the item of content to a blog, web page, or bookmark list.

In fact, there are many examples of such social references, so that the list above is meant to be merely illustrative and not exhaustive of the complete list of social references reference counter 32 may monitor and keep a count of.

Reference counter 32 may be a stand-alone item of hardware and software, or may form a part of a large system. It may also be comprised of a centralized server application that receives a count of social references from a plurality of user computing devices 22.

Figure 4:
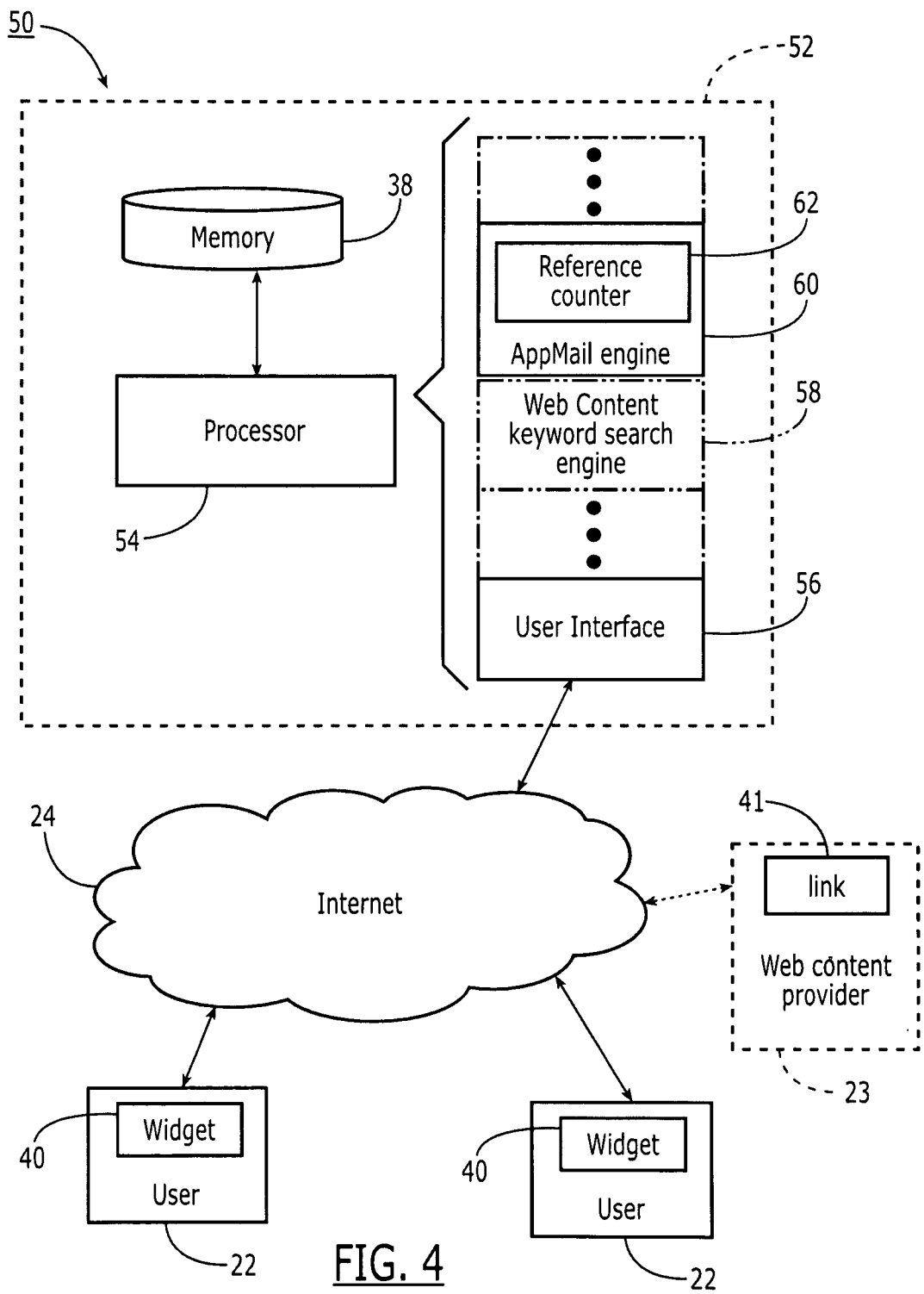
FIG. 4 is a block diagram illustrating networked web services devices/software and multiple user computing devices connected via the Internet according to another embodiment of the present invention.

With reference now to FIG. 4, for purposes of illustration, it will be assumed that reference counter 32 obtains count data from user computing devices, as opposed to directly monitoring and determining the count of social references, although it will be appreciated that many other arrangements for monitoring and maintaining a count of social references are within the scope of this disclosure. It will further be assumed for the purposes of explaining an embodiment of the present invention that a system 50 includes a web server 52 with a processor 54 on which is running a plurality of software programs, including a user interface 56, a web content keyword search engine 58, and an AppMail engine 60, discussed further below, which includes a reference counter 62, as well as other appropriate software programs not further discussed herein.

In order to obtain a count of social references from each user computing device 22, each user computing device 22 includes a software component, such as a widget 40, which informs reference counter 62 of each social reference to an item of content, or alternatively which monitors and maintains a count of social references on that user computing device 22, and which periodically sends the current count of social references for that user computing device 22 to reference counter 62. Widget 40 allows the user to "share" content (and optionally offers other functionality) without leaving the content page.

One example of a system that includes the functionality to monitor and keep a count of social reference data is the APPMAIL engine described in U.S. patent application Ser. No. 11/939,516. In essence, the APPMAIL engine, integrates e-mail into the functionality of an underlying or "basic" software application running on the server/processor 30 or elsewhere, such as a collaboration tool.

Each user computing device 22 in communication with the AppMail engine 60 includes a widget 40 that communicates with AppMail engine 60. Widget 40 may, in one embodiment, be an add-on to a web browser application, presenting certain of its functionality to a user as controls or a toolbar of controls in the web browser window or alternatively in a window separate from the web browser. Certain of the functionality of the widget 40 are effectively transparent to the user. For example, each time an item of content is emailed by that user computing device 22, widget 40 alerts the AppMail engine 60. AppMail engine 60 include a reference counter 62 which increments for that item of content when it is informed of an email of that item of content. Thus, each user computing device 22 reports in to AppMail engine 60 when content (or a link thereto) is emailed, and AppMail engine 60 keep track of the number of such emails in its reference counter 62. The APPMAIL engine serves to couple multiple user computing devices together. Thus, for the purposes hereof the AppMail engine 60 and widgets 40 are collectively referred to herein as the Grouptivity system. Given that the various widgets are communicatively coupled to one another within the Grouptivity system, and in some actions act collaboratively, and the Grouptivity system (via the AppMail engine) keeps track of certain social references to content made amongst the members of the collaboration, there is an opportunity to collect and use many types of social reference (e.g., sharing) data.

Figure 1:
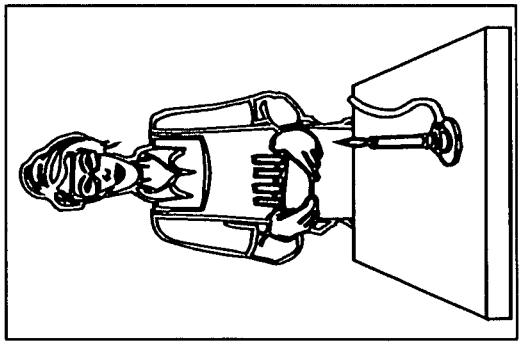
FIG. 1 is an example of a web site which provides users with the option to email the displayed content, or a link thereto, to another user.

It will be appreciated that in an alternate embodiment of the present invention a software application runs on a website publisher's server, and provides a user with the option of sharing content published at that website. For example, a publisher's site might include a button permitting the user to send the content on a page to another user via email (see FIG. 1). The emailing functionality in this example resides on the web publisher's computer as opposed to the user's computer. In addition, in this embodiment the monitoring, counting, and reporting functionality reside on the publisher's computer, which periodically informs the AppMail engine of the number of shares of the content and related data.

As yet another alternate embodiment, in place of widget 40, a link 41 may be provided on a content provider's site 23, which directs a user to another site (e.g., a "sharing" site, in this case on server 50) that allows the user to share content, and which itself tracks that sharing and other details. In this embodiment the sharing and counting/tracking is managed completely by server 50, other than the server on which the content site is hosted, and other than the user computing device. Thus, while described further in terms of the widget 40 residing on the user computing device 22, with appropriate adjustments to the description below other arrangements such as widget functionality residing on a website publisher's computer or a third party site are contemplated and within the scope of the present invention.

Referring back to FIG. 1, when a user viewing web page 10 wishes to share the article, or a link thereto, with another user, the user may simply click on the "Send" and then the "Email" selections in the pull-down menu 18. To facilitate this, the web page 10 has been loaded by a typical browser application and includes the sharing pull down menu 12. In one exemplary embodiment, an add-on (widget) to the web browser application on the user's computer has been loaded and invoked, which provides specific functionality to facilitate social reference to the web page, e.g., sharing that page. One example of this special functionality is provided by a software application referred to as SocialMail and described in more detail in the aforementioned U.S. patent application Ser. No. 11/939,516. The "Email" selection from the pull down menu may then be linked to the SocialMail functionality and easily activated from the toolbar button of the web browser.

In such case, once a user finds a page/article that the user desires to share with others, the user can simply click on the "Email" selection from pull down menu 12 on the browser toolbar. This will initiate within SocialMail the process of emailing the content directly to one or multiple people as shown and described in further detail below.

Selection of "Email" in pull-down menu 12 brings up an email interface which provides a user with the controls for generating an email including the content, or a link to the content, to a third party. Similar choices for sharing the content via SMS or other similar protocol may also be provided although not shown in this example.

Figure 5B:
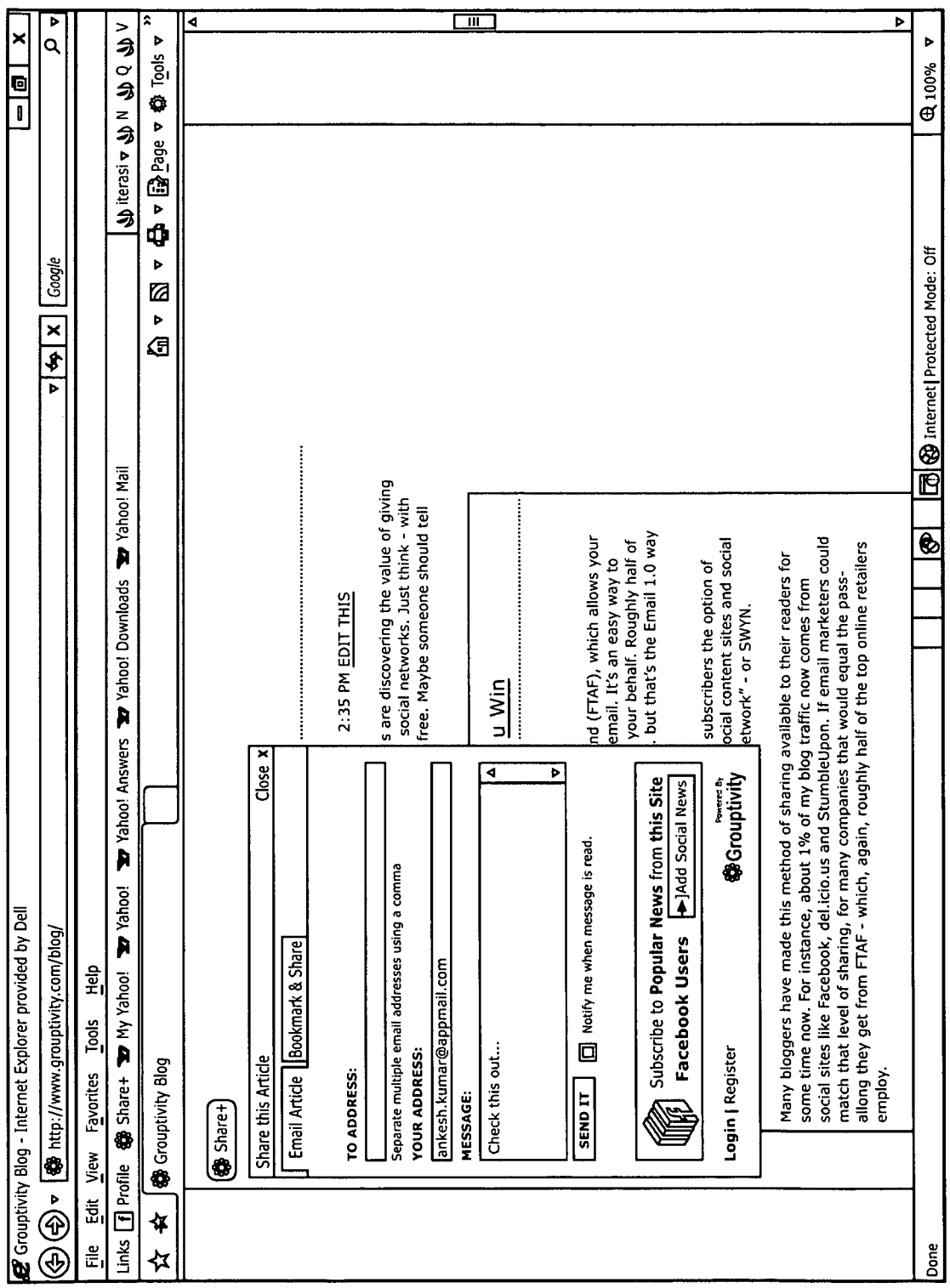
Figure 5C:
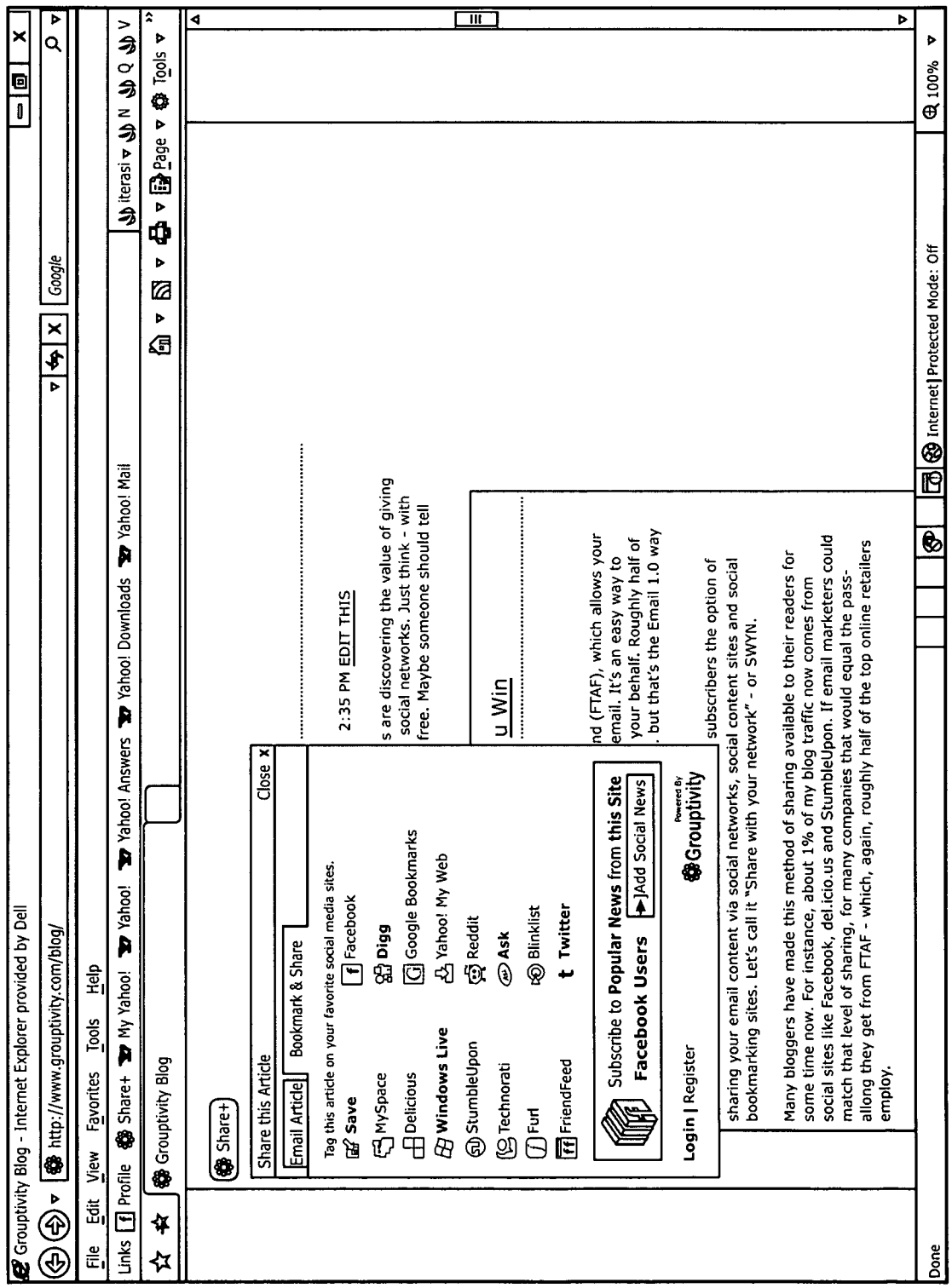

One such interface to the SocialMail software facilitating sharing by email of the content is illustrated in FIG. 5A. (Another example of an interface for sharing an item of content by email is illustrated in FIG. 5B. AN example of an interface for bookmarking and sharing an item of content via a third party site is illustrated in FIG. 5C.) While various different mechanism are possible, one exemplary approach is that upon selection of "Email" from a pull-down menu in the toolbar of a browser application, a SocialMail popup window 70 is displayed and the fields in the popup are populated so that the subject line is populated with the title 72 of the content (e.g., the title of an article) displayed in the web browser window when the toolbar button is selected, and the link 74 to the article is inserted into the message body 76. The user can then add email addresses in field 78 and an optional personal note in body 76, before sending out the SocialMail email by selecting the "Send" button 80. Additional features of the SocialMail interface may also be provided, but are beyond the scope of the present application.

Upon selecting "Send" in window 70, the SocialMail widget on the user's computer creates a database entry or similar data element for the social reference data, which in one embodiment contains at least an indication that the content was shared by email, and an identification of the content itself. In other embodiments, other social reference data may be maintained, either exclusively or in combination with other social reference data. Such other social reference data maintained by the SocialMail widget include: date and time of sending of email, identification of recipient(s) of email, identification of sender of email, website from which content was viewed prior to sending, type of content, which pages have been viewed (and how many times) regardless of sharing, other actions performed with respect to the content (such as bookmarking, adding to a web page or blog), etc. In addition, the SocialMail widget may also include functionality for analyzing the receipt of email communications (or communications in some other form) from other SocialMail clients that include a share of content or a link, and maintain data regarding such received sharing. One feature enabled by this functionality is to determine and maintain a count of the items of content received as a share that are then further shared with (e.g., forwarded to) other users.

Referring back to FIG. 4, periodically, widget 40 provides the data it is maintaining regarding the sharing of content to the AppMail engine 60 running on server 52. AppMail engine 60 processes the data received from each widget 40. One element of functionality of AppMail engine 60 is to maintain a count of the number of times an item of content is shared by one user with another user. One presumed interpretation of this form of social reference to content is that it indicates, from a user's perspective, that the item of content is meaningful or otherwise of interest. It is our belief that this indication is useful in ranking search results. That is, one metric for the relevance of a search result is how often each item returned from the search has been shared. A large number of shares indicates a high level of significance from a user's perspective. We believe this is extendable to other forms of social reference beyond sharing, such as adding content or a link to a web page or weblog, etc.

However, prior to applying the social reference data to search results, AppMail engine 60 may perform one or more analyses of the count of social reference data provided by widgets 40. There are many different metrics that may be used to evaluate the significance of the social reference data. Some metrics exclusively use data provided by the SocialMail widgets, while other metrics employ data from a variety of sources including but not limited to the SocialMail widgets. For example, a ranking factor may be generated based on the number of times an item of content is shared divided by the number of times an item of content is viewed. Such a ratio is referred to herein as a normalized ranking, and in the previous example of shares/views, the share data is said to be normalized for view data. Other such normalized rankings include: shares normalized for shares by a plurality of users, shares normalized for format of sharing (e.g., email, SMS), shares normalized for content type (e.g., ratio of shares of a particular audio content divided by the total number of audio content shares), shares normalized for type of website on which the content is located, shares of content normalized for the recipient population, shares normalized for the number of times all content is shared, shares normalized for the number of times content is added to a web page, shares normalized for the number of times said item of content is added to a bookmark list, shares normalized for the number of subsequent (e.g., second) shares (i.e., sharing shared data), and so forth. Making a complete list of such normalizations is not possible. Therefore, the list above is merely exemplary, and shall not be interpreted as limiting in any way.

Additional ranking factors may be applied to search results which are not normalizations. For example, it may be desirable to separate search results by whether such results were or were not shared at all. For those items of content that were shared, it may be desirable to simply apply a multiplier equal to the number of times the content was shared, or a scaled multiplier equal to the number of times the content was shared divided by a constant, etc.

However obtained, the immediate goal is to obtain a ranking factor which represents user-perceived relevance based on social reference data. It is the maintaining of a count of such social references (e.g., a count of the number of shares) by the reference counter 62 of AppMail engine 60 which facilitates obtaining these ranking factors.

Figure 6:
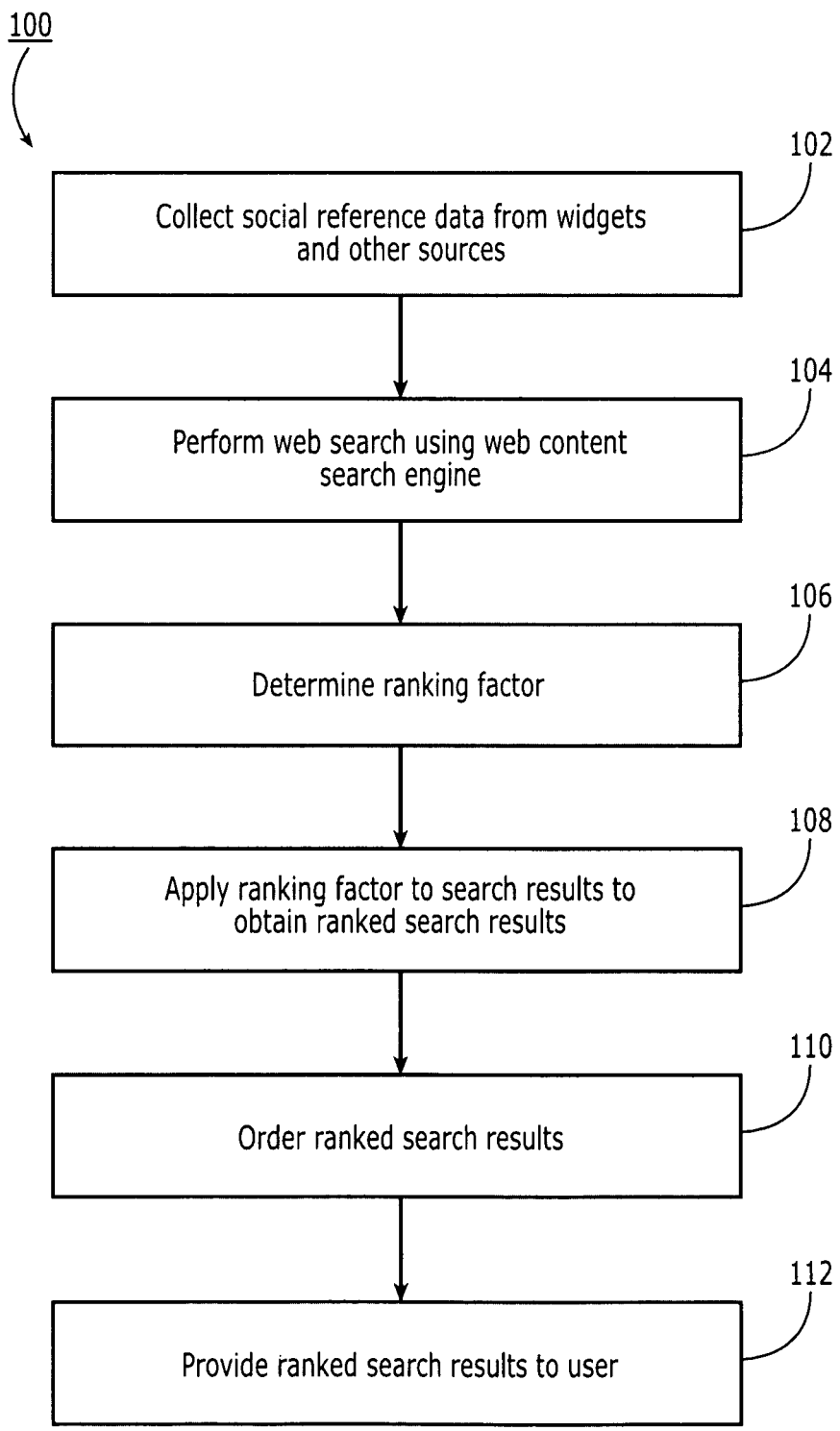
FIG. 6 is a flow diagram illustrating the steps of determining and applying social reference relevance and ranking to search results obtained from a known web content search engine according to an embodiment of the present invention.

Once a ranking factor is obtained, the ultimate goal is to use the ranking factor to order search results such that the user is presented with a SERP having the search results ordered from most relevant to least relevant. This may be accomplished is many ways. One exemplary process 100 for obtaining search results ranked for social reference data is illustrated in FIG. 6. On an going basis, social reference data is obtained at step 102 from widgets and other sources that will be required to calculate the ranking factor for content. For purposes of illustration assume that we are interested in obtaining search results with ranked for social reference, for the keyword "Nashua." Specifically, we are interested in a ranked SERP ranked for the number of shares normalized for the number of views. Initially, an otherwise known web content search engine is employed to perform a keyword search at step 104.

The search returns a plurality of "hits", each an address of content containing the keyword. The initial list of hits may be ordered using another ranking system, such as PageRank, etc. For a specific item of content returned by the search engine, a ranking factor of a type discussed above is determined at step 106. Data for a specific item of content is obtained from reference counter 62 (FIG. 4). For example, the search engine returns an article entitled "Harbor Homes holds Thanksgiving meal", which is found at the URL "http://www.nashua-telegraph.com". The count of the total number of times this article was shared by users, as reported by widgets 40, is determined from reference counter 62. Likewise, the total number of times this article was viewed by users, as reported by widgets 40, is determined by reference counter 62. AppMail engine 60 then calculates the shares normalized for views for this item of content by dividing the total number of shares by the total number of views to obtain a ranking factor at step 106.

Figure 7:
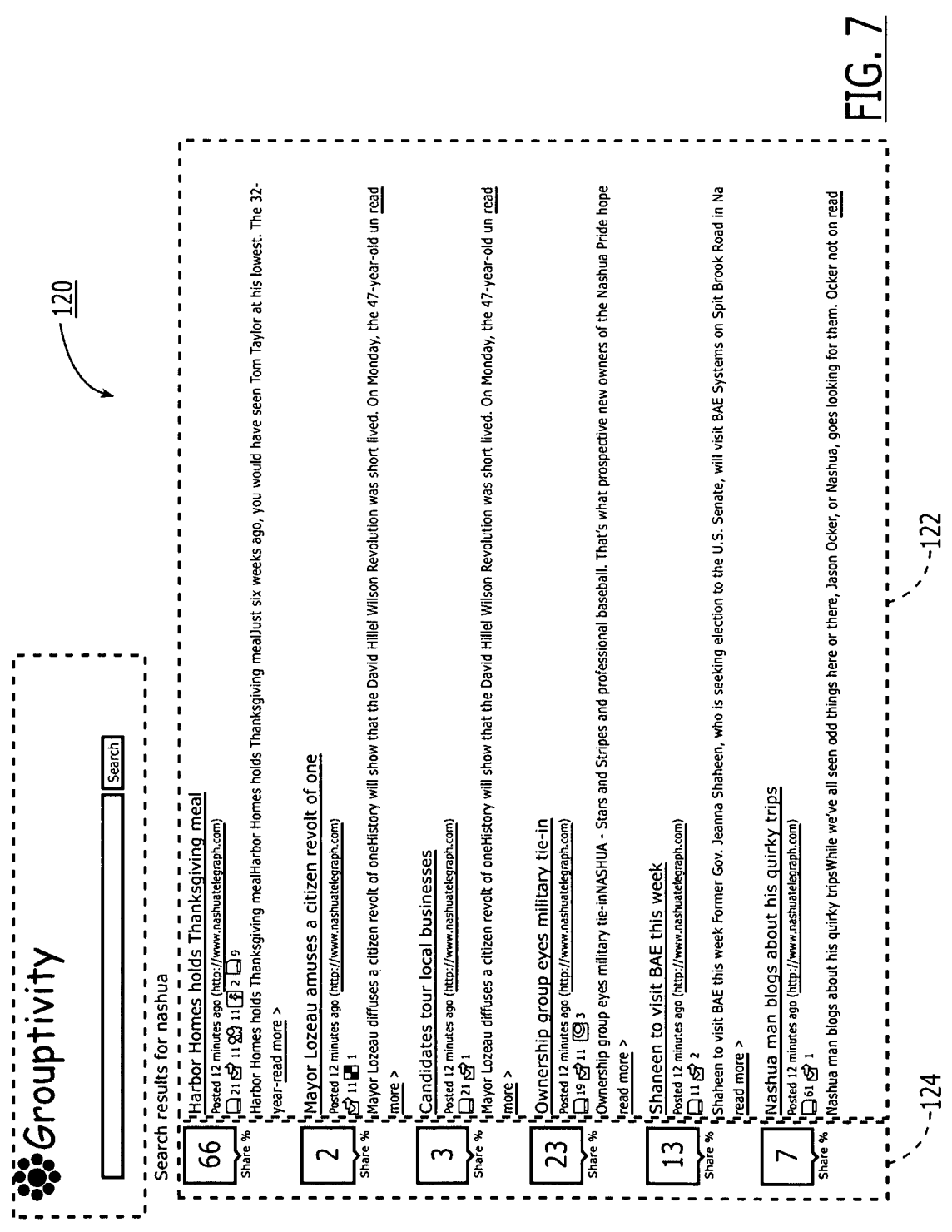

At this point the ranking factor may be applied to the search results in various ways. One example 120 of the application of the ranking factor is illustrated in FIG. 7, in which the search results are displayed in rows in a first column 122 as is typically provided in a SERP, ordered in the ranking provided by the search engine, and a new column 124 of data is provided on the SERP which displays the normalized share ranking (the "Share %" label indicating the percentage of times the item of content was shared as compared to the number of times it was viewed). Of course, many other forms and orders of the search results are possible. For example, the search results may be ordered from greatest to least by the data in column 124. Furthermore, the ranking leading to the order of listing may be a composite of the search engine ranking and the social reference ranking. For example, if the PageRank for an item of content returns a rank value of 0.8 (as determined by the search engine), and the social reference ranking is determined to be 0.6, the item of content may have a composite ranking factor of 0.8×0.6=0.48, and the SERP may be ordered by this composite ranking factor for each item of content returned by the search.

In addition, different weights can be assigned to the social reference ranking, for example based on the method of sharing. For example, sharing an item of content via Facebook may have a weighting factor of 0.5, while emailing an item of content may have a weighting factor of 0.7. There are many factors which go into assigning such weighting factors, but one example for assigning them is that the time and effort it takes to email content to a friend is greater, and thus indicates and perceived greater importance than the time and effort it takes to add a link to Facebook. The weighting factor may alternatively be applied to the raw count of social references prior to normalizing, as would be determined as part of implementing the present invention.

It is a reality of business on the internet, and indeed business everywhere, that the more a supplier of goods or services is seen by potential customers the more business that supplier will have from those customers. For this reason, and others, there have been certain members of the on-line community who have attempted to manipulate the algorithms used to determine relevance and rank. An increased ranking can result in the site being listed ahead of other sites for certain searches, increasing the number of potential visitors and paying customers.

Manipulations of search result data are generally referred to as Black Hat techniques, and often involves automated link placement or following (e.g., spamdexing), artificially generating links to a site from another site with a very high PageRank (e.g., 302 Google-jacking), and mass emailing of links in the hopes that many recipients follow that link (spamming).

Similarly, there is a possibility that social reference data may be manipulated in order to artificially increase the a site's social reference search results relevance and ranking. One obvious way that the social reference data may be manipulated is to send content or a link thereto to many, many recipients, making it appear as though the sender believed that the content would be of interest to the masses. However, for many reasons this is undesirable. A relatively simple method to limit this practice is to record and base social reference relevance and ranking determinations only on sharing actions from different IP addresses (i.e., not counting multiple sending of the same content from the same source). Another approach is to require the sender to have a valid account at a subscription site (e.g., Digg.com, Facebook, etc.) and/or to record and base social reference relevance and ranking determinations only on instances of sharing where the receiving party is a member of such a subscription site. Other techniques for addressing manipulation of social reference data are known and within the scope of the present disclosure. Therefore the description above is merely illustrative and shall not be read as limiting the scope of the claims hereof.

It will now be appreciated that a system and method for obtaining and utilizing social reference data with web content search results have been disclosed. The examples above have been in the context of emailing content or a link to content between users as a form of social reference. However, the examples and concepts provided above extend to similar systems and methods utilizing sharing of content by virtually any web-based methodology, including sending SMS text messages with reference to the content therein, adding a link to a website or weblog, or bookmarking a website on a user's machine or group list.

For example, the AppMail engine permits a user to incorporate bookmarks from third party sites and products, such as del.icio.us (http://delicious.com/), blogs, travel sites, friend networks, etc., into the collaboration system. Thus, while using the Grouptivity system, users can pull information from third party sites and accounts with which they are registered. For example, a user that is registered with del.icio.us can login to their account pull information, articles, etc. from del.icio.us and post them into the Grouptivity system. This may occur in two steps.

Figure 8:
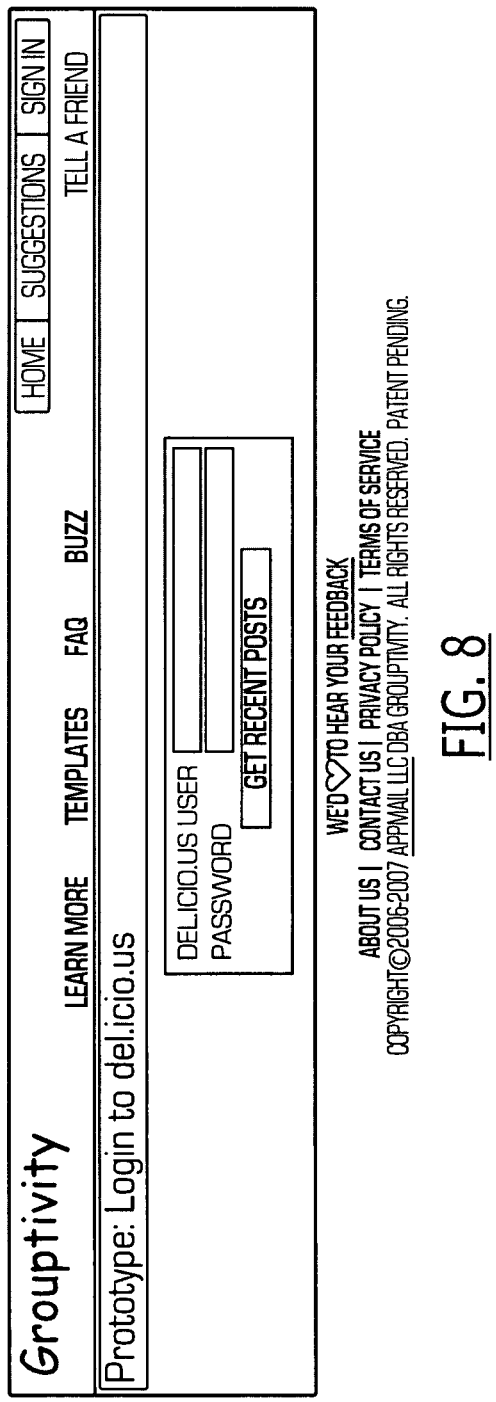
FIG. 8 is an example of a user interface for accessing a third party website for the purposes of incorporating bookmarks.

Step 1—From Grouptivity, a user logs into a third party account (See FIG. 8 for an example of the user interface for logging into the third party site).

Step 2—User sees information and posts in the third party account. The user clicks on a button to retrieve information from the third party account and then, using the exemplary user interface shown in FIG. 9, the user can start a new discussion within the Grouptivity system related to content from the third party account or the user can select specific content to add to an existing discussion within the Grouptivity system.

Widgets 40 may be provided with instructions that track such incorporation of bookmarks to content (another example of social reference), and may provide a count of same to AppMail engine 60. AppMail engine 60 may then use that count to create a rank based on the incorporation data (normalized or otherwise, as discussed above).

The system also permits a user to post contents from a Grouptivity discussion thread to one or more third party sites, such as blogs, social networking sites, etc. FIG. 10 illustrates an example of a user interface for posting content from the collaboration system to third party sites. Thus, while using Grouptivity, if a user has another account with a third party site (example: My Space), the Grouptivity user can post contents from a Grouptivity discussion into the third party site, blog, etc. Widgets 40 may again monitor and maintain a count of such postings for items of content, and provide that data to AppMail engine 60 for use in creating a social reference ranking based on posting (again, normalized or otherwise, as described above).

The Grouptivity system allows a user to take a subset of data and create a public record of it and thereby allow people to make, what is already bookmarked through Grouptivity, "public". The bookmarks may be initiated from within a web page having an item of content or from an external button, such as a browser application or bookmarklet. The public record may be created in several different ways using the Grouptivity collaboration system, such as through a dedicated control for this feature (not shown). However, the decision to make certain content public may serve as evidence of perceived user relevance of the content made public. Accordingly, such actions may be monitored by the widgets 40, and a count thereof provided to AppMail engine 60 so that a social reference ranking based on making content public (again, normalized or otherwise, as described above) may be determined.

Figure 11:
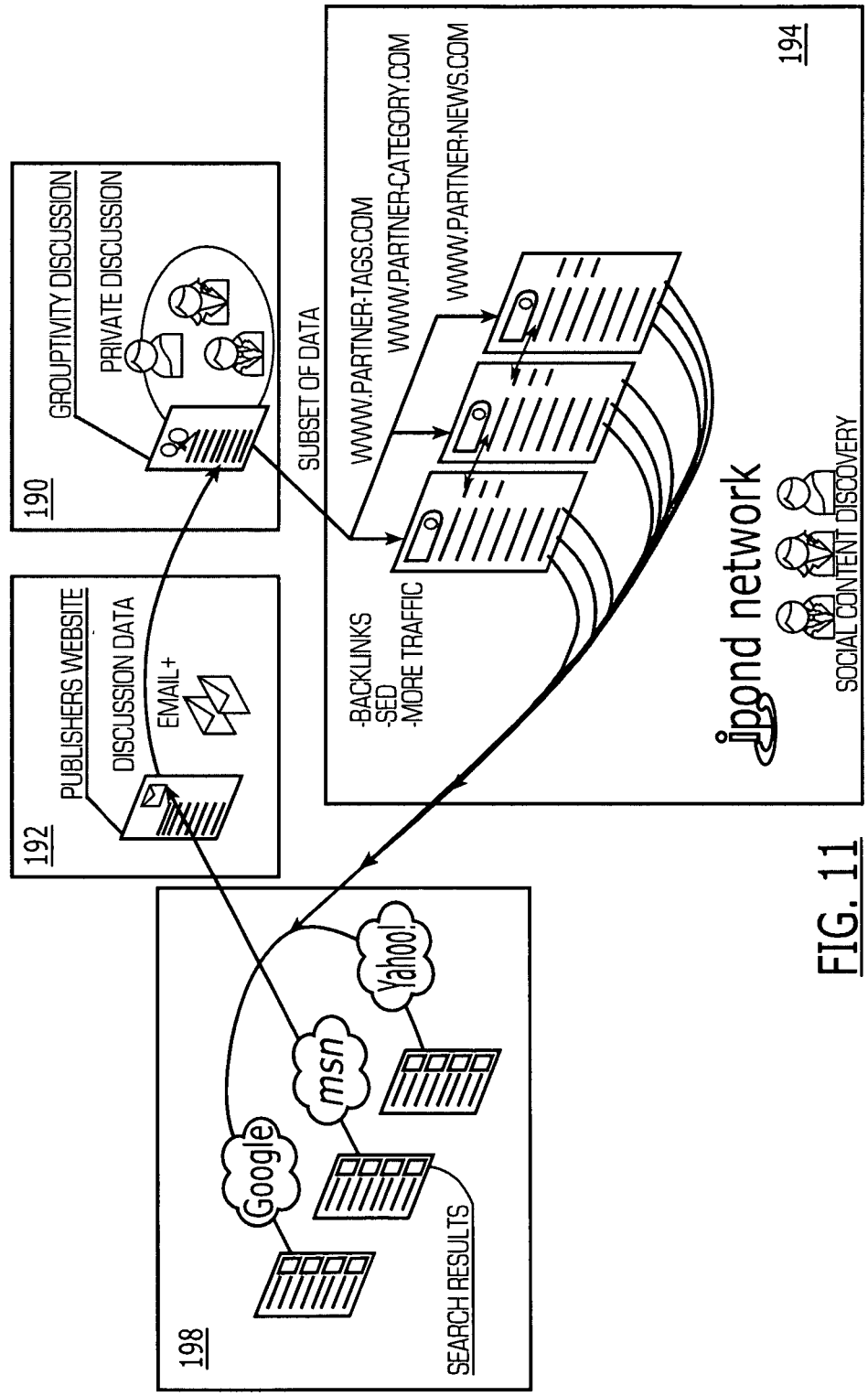
FIGS. 11-13 illustrate an integrated collaboration system and web site.
Figure 12:
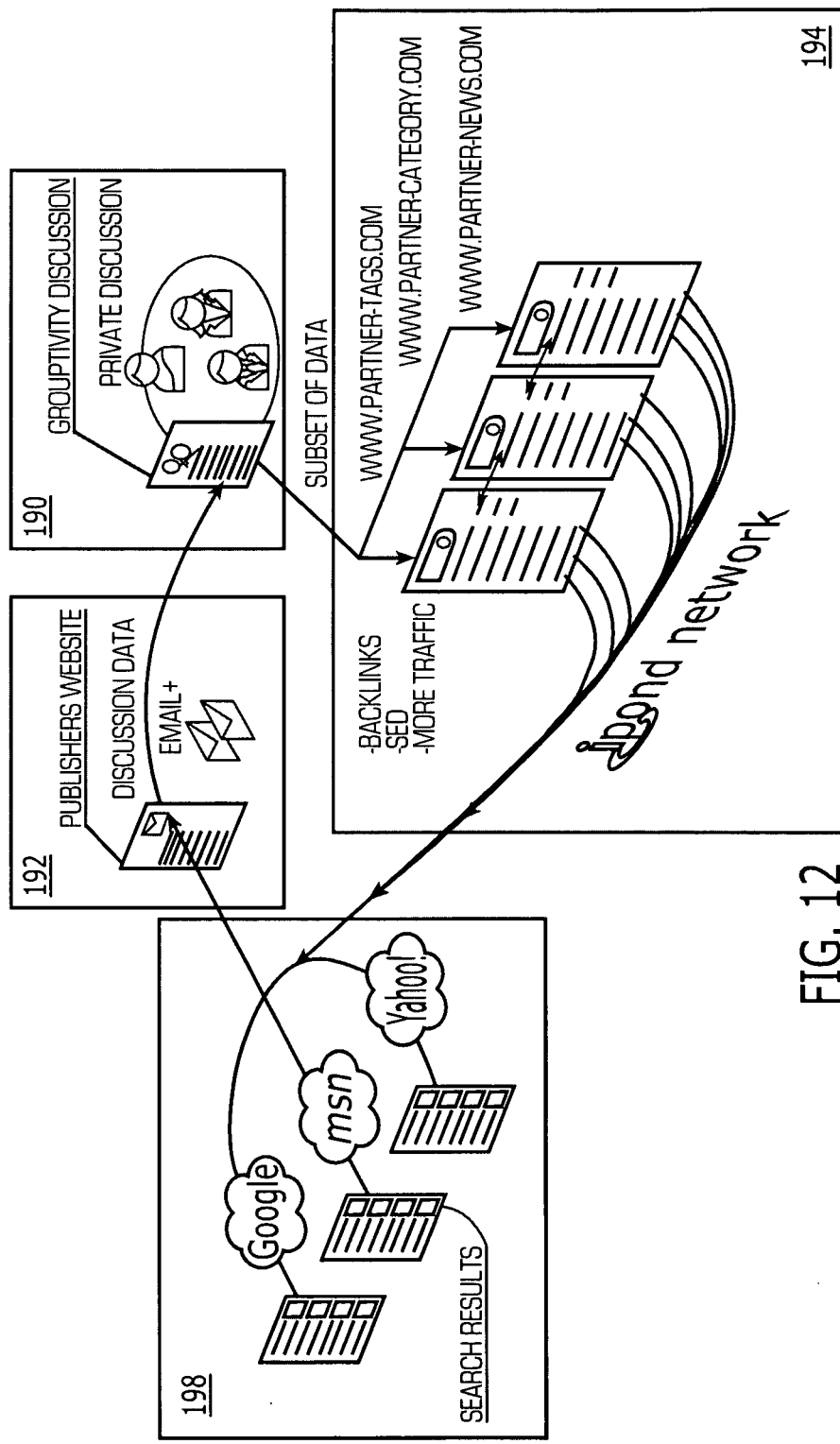
Figure 13:
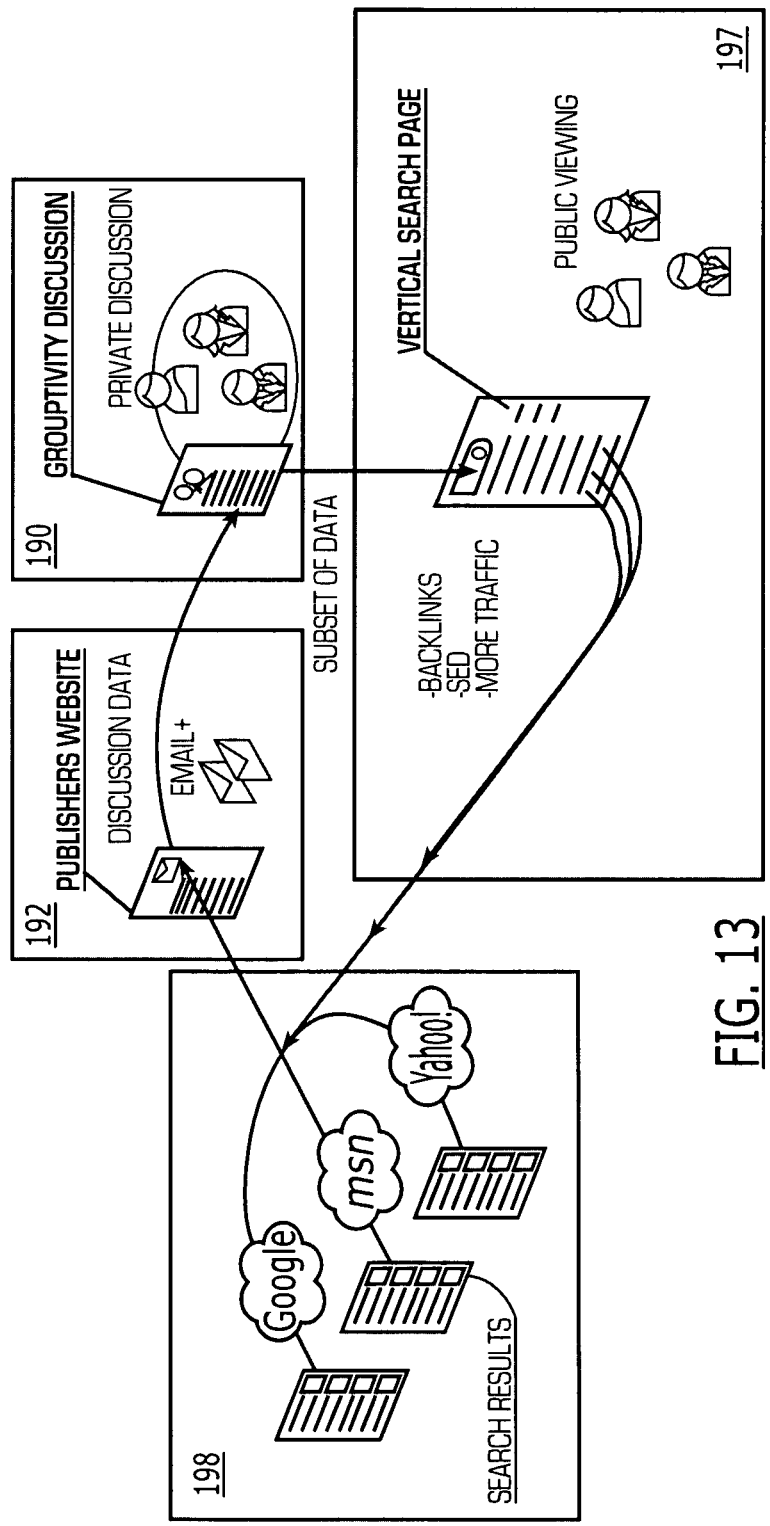

FIGS. 11-13 illustrate the collaboration system integrated with search engines. The collaboration system may host a private discussion 190 based for example on content from a publisher's website 192. The private discussion may generate discussion data and a subset of that data (which is made public as described above) is available for crawling, scraping, etc. by one or more public sites 194 (as shown in FIG. 11 and FIG. 12) or a vertical search page 197 (as shown in FIG. 13). The public sites or vertical search pages may then generate more traffic, backlinks and search engine optimization (SEO) data that are sent to one or more search engines 198. The one or more search engines generate search results based on a user query and also feeds data to the publisher's website 192. Thus, the integration with search engines allows the user to search for key words in all other "social networks" and provide an extended list for searcher. Results of searches within the Grouptivity system can also provide insight into the relevance of search results from general search engines, and thus widgets 40 may monitor and maintain a count of keywords used for searches, the number of times such searches are performed, the hits returned from such searches, the items of content actually reviewed by a user from such searches etc. Some or all of this data may then be used by AppMail engine 60 to create rankings based on the inter-Grouptivity search results as yet another form of social reference data.

As shown in FIGS. 11-13, the collaboration system may make use of a social network application referred to as iPond, which aggregates and ranks emailed web content. iPond allows a user to post the content (or link thereto) to a site where it can be shared/viewed by their friends and/or the general public which in turn allows the viewers to review the content that is being shared and to be directed back to the content site. This is further filtered such that the content that is more often posted rises to the top of the rankings at that site.

iPond takes advantage of a "wisdom of the crowds" principle that states that the general consensus of a group is a better indication of value than an expert in the field since a group can distill the most interesting content better than an editor. In addition, it utilizes "human filtering" which means that a human has reviewed the content, which improves the search and discovery of interesting web content. iPond takes advantage of these principles along with the fact that the most common way for users to share and distribute web content is via email which does not require a learning curve and is the basis for the collaboration system and method described above. Thus, the sharing and distribution of content using the Grouptivity collaboration system described above is coupled with a search and discovery site (iPond) which provides the publisher referral traffic to their content via "human filtering." Each posting of content to iPond may be monitored and counted. Those postings can then be used to determine a social reference relevance and ranking factor as described above.

Furthermore, iPond (and similar sites) provide users with an opportunity to comment on the items of content displayed by the site. A comment on an item of content can be monitored and counted, and used to determine a social reference relevance and ranking factor as described above. Furthermore, comments can be monitored for the use of certain keywords, and each use of a keyword can be counted and the total count used to determine a social reference relevance and ranking factor as described above.

While the foregoing has been with reference to a particular embodiment of the system and method, it will be appreciated by those skilled in the art that changes in this embodiment may be made without departing from the principles and spirit of the invention, the scope of which is defined by the appended claims.

The embodiments described, and hence the scope of the claims below, encompass embodiments in hardware, software, firmware, or a combination thereof. It will also be appreciated that the methods, in the form of instructions having a sequence, syntax, and content, of the present disclosure may be stored on (or equivalently, in) any of a wide variety of computer-readable media such as magnetic media, optical media, magneto-optical media, electronic media (e.g., solid state ROM or RAM), etc., the form of which media not limiting the scope of the present disclosure. A computer reading said media is operable to either transfer (e.g., download) said instructions thereto and then operate on those instructions, or cause said instructions to be read from the media and operate in response thereto. Furthermore, devices (e.g., a reader) for accessing the instructions on said media may be contained within or connected directly to the computer on which those instructions operate, or may be connected via a network or other communication pathway to said computer.

Furthermore, while a plurality of preferred exemplary embodiments have been presented in the foregoing detailed description, it should be understood that a vast number of variations exist, and these preferred exemplary embodiments are merely representative examples, and are not intended to limit the scope, applicability or configuration of the disclosure in any way. Various of the above-disclosed and other features and functions, or alternative thereof, may be desirably combined into many other different systems or applications. Various presently unforeseen or unanticipated alternatives, modifications variations, or improvements therein or thereon may be subsequently made by those skilled in the art which are also intended to be encompassed by the claims, below.

Therefore, the foregoing description provides those of ordinary skill in the art with a convenient guide for implementation of the disclosure, and contemplates that various changes in the functions and arrangements of the described embodiments may be made without departing from the spirit and scope of the disclosure defined by the claims thereto.

What is claimed is:

1. A system for producing web content keyword search results comprising:
    a web server on which is operating a web content keyword search engine;
    a reference counter for maintaining a count of a number of social references made to an item of content;
    a user interface to said web content keyword search engine for receiving a web keyword search request; and
    a processor programmed to:
        receive said web keyword search request, and in response access said web server to execute said web keyword search request by said web count keyword search engine;
        in response to said web keyword search request, receive an identification of one or more items of content, at least one of said items of content being a subject of a count of a number of views of said item of content of said items of content and a count of a number of social references to said item of content of said items of content as maintained by said reference counter, a social reference comprising at least one of a sharing of said item of content and a sharing of a source of said item of content;
        determine, for each said item of content which is the subject of a count of a number of social references, an associated social reference ranking factor that is a ratio of the count of the number of social references to said item of content to the number of views of said item of content;

provide said items of content for display as results of said web content keyword search, the results ordered in a first ranking provided by the web content keyword search engine; and provide, for each item of content of the results that are ordered by the first ranking, a graphical representation of the associated social reference ranking factor for display adjacent the item of content in the results that are ordered by the first ranking.

2. The system of claim 1, wherein said items of content are provided for display in descending order from highest to lowest social reference ranking factor.

3. The system of claim 1, wherein said social reference is a sharing of said item of content by a user, and said social reference ranking factor is a count of the number of times said item of content has been shared by said user.

4. The system of claim 3, wherein said items of content are provided for display in descending order from highest to lowest count of the number of times said items of content have been shared.

5. The system of claim 3, further including a user computing device in communication with said user interface, wherein said user computing device issues said search request, and said items of content with an associated count of the number of times each said item of content has been shared by said user are provided to said user computing device for display.

6. The system of claim 5, wherein said items of content are provided for display on said user computing device in descending order from highest to lowest count of the number of times said items of content have been shared.

7. The system of claim 5, wherein said user computing device includes a software component for monitoring and maintaining a count of said number of times each said item of content has been shared by said user and for providing said count to said reference counter, whereby said reference counter may maintain said count of the number of social references made to an item of content for a number of user computing devices.

8. The system of claim 1, wherein said social reference is a sharing of said item of content by a user, and said count of the number of social references is a count of the number of times said item of content has been shared by said user with a unique third party.

9. The system of claim 8, wherein said items of content are provided for display in descending order from highest to lowest count of the number of times said items of content have been shared with a unique third party.

10. The system of claim 1, wherein said processor forms a part of said web server.

11. The system of claim 1, wherein said reference counter forms a part of said web server.

12. The system of claim 1, wherein a weighting factor for said item of content is applied as part of determining the social reference ranking factor for the item of content, wherein a magnitude of the weighting factor depends on a specific type of social reference of the item of content.

13. The system of claim 1, wherein the sharing comprises at least one of peer-to-peer, peer-to-group and group-to-peer sharing.

14. The system of claim 1, wherein the items of content are displayed in a first column and the associated social reference ranking factors are displayed in a second, differing column.

15. The system of claim 1, wherein the first ranking is provided based on the associated social reference ranking factors for each item of content.

16. The system of claim 1, wherein the ratio is a quotient of the count of the number of social references to said item of content and the number of views of said item of content.

17. A method for producing web content keyword search results, comprising:

receiving, at a web server, a web content keyword search request;

performing, using the web server, a web content keyword search in response to said web content keyword search request;

receiving, from the web server, an identification of at least one item of content in response to said web content keyword search;

obtaining, from a reference counter, a count of a number of view of each item of content of the at least one item of content and a count of a number of social references made to each item of content of the at least one item of content, a social reference comprising at least one of a sharing of said item of content and a sharing of a source of said item of content;

determining, for each item of content, an associated social reference ranking factor that is a ratio of the count of the number of social references to said item of content to the number of views of said item of content;

delivering said at least one item of content for display as results of said web content keyword search, the results ordered in a first ranking provided by the web server; and delivering, for each item of content of the results that are ordered by the first ranking, a graphical presentation of the associated social reference ranking factor for display adjacent the item of content in the results that are ordered by the first ranking.

18. The method of claim 17, wherein said social reference is a sharing of said item of content by a user, and said social reference ranking factor is a count of the number of times said item of content has been shared by said user.

19. The method of claim 18, wherein said social reference ranking factor is based on a count of the number of times said item of content has been shared by a plurality of users, and said count counts sharing by anyone user only once for each unique item of content.

20. The method of claim 17, wherein said social reference is a sharing of the source of said item of content by a user, and said count of the number of social references is a count of the number of times said source of said item of content has been shared by said user.

21. The method of claim 17, wherein said items of content are provided for display in descending order from highest to lowest number of said social references to said items of content.

22. The method of claim 17, wherein said web content keyword search includes a search ranking factor, and further comprising the step of creating a composite ranking factor based at least on said social reference ranking factor and said search ranking factor.

23. The method of claim 17, wherein a weighting factor for said item of content is applied as part of determining the social reference ranking factor for the item of content, wherein a magnitude of the weighting factor depends on a specific type of social reference of the item of content.

24. The method of claim 17, wherein the sharing comprises at least one of peer-to-peer, peer-to-group and group-to-peer sharing.

25. A computer-readable memory device having stored thereon computer implemented instructions for producing web content keyword search results, the instructions stored thereon comprising:

instructions for receiving a web content keyword search request;

instructions for performing a web content keyword search in response to said web content keyword search request;

instructions for receiving an identification of at least one item of content in response to said web content keyword search;

instructions for obtaining, from a reference counter, a count of a number of views of each item of content of the at least one item of content and a count of a number of social references made to each item of content of the at least one item of content, a social reference comprising at least one of a sharing of said item of content and a sharing of a source of said item of content;

instructions for determining, for each item of content, an associated social reference ranking factor a ratio of the count of social references to said item of content to the number of views of said item of content;

instructions for delivering said items of content for display as results of said web content keyword search, the results ordered in a first ranking; and instructions for delivering, for each item of content of the results that are ordered by the first ranking, a graphical presentation of the associated social reference ranking factor for display adjacent the item of content in the results that are ordered by the first ranking.

26. The computer-readable memory device of claim 25, wherein the sharing comprises at least one of peer-to-peer, peer-to-group and group-to-peer sharing.

* * * * *

UNITED STATES PATENT AND TRADEMARK OFFICE
CERTIFICATE OF CORRECTION

PATENT NO. : 8,626,823 B2
APPLICATION NO. : 12/347896
DATED : January 7, 2014
INVENTOR(S) : Ankesh Kumar Page 1 of 1

It is certified that error appears in the above-identified patent and that said Letters Patent is hereby corrected as shown below:

In the Claims

Column 14, Line 40, Claim 1, delete "results" and insert --results,--.

Signed and Sealed this
Fourteenth Day of October, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,626,823 B2 | Page 1 of 1 |
| APPLICATION NO. | : 12/347896 | |
| DATED | : January 7, 2014 | |
| INVENTOR(S) | : Kumar | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 593 days.

Signed and Sealed this
Second Day of June, 2015

Michelle K. Lee
*Director of the United States Patent and Trademark Office*